Oct. 17, 1950   R. J. STAVA   2,526,094
X-RAY CAMERA
Filed Sept. 24, 1947   3 Sheets-Sheet 1

INVENTOR.
ROBERT J. STAVA
BY
ATTORNEYS

Oct. 17, 1950     R. J. STAVA     2,526,094
X-RAY CAMERA

Filed Sept. 24, 1947     3 Sheets-Sheet 2

INVENTOR.
ROBERT J. STAVA
BY
Hyde, Meyer, Baldwin & Doran
ATTORNEYS

Oct. 17, 1950    R. J. STAVA    2,526,094
X-RAY CAMERA

Filed Sept. 24, 1947    3 Sheets-Sheet 3

INVENTOR.
ROBERT J. STAVA
BY
Hyde, Meyer, Baldwin & Doran
ATTORNEYS

Patented Oct. 17, 1950

2,526,094

UNITED STATES PATENT OFFICE 2,526,094

X-RAY CAMERA

Robert J. Stava, University Heights, Ohio, assignor to Picker X-Ray Corporation Waite Manufacturing Division, Inc., Cleveland, Ohio, a corporation of Ohio Application September 24, 1947, Serial No. 775,863

4 Claims. (Cl. 250—65)

This invention relates to photographic cameras, such as are used more particularly for producing negatives on roll film from X-ray images cast upon a fluorescent screen. The invention has to do with advancement of the film between successive exposures.

X-ray photographic apparatus of the kind here involved is employed for rapidly taking like pictures of a large number of individuals or patients, such as where all the employees in an industrial plant are examined in succession for evidence of some harmful condition or disease. The patients, in turn, step to a standard position between an X-ray tube and fluorescent screen, whereupon the operator presses a button to energize the tube and thus cast the usual shadow image upon the the screen. Since the camera is focused upon the screen, the image is reproduced upon the film, in negative form. Usually, in such apparatus, termination of the exposure period, by relay or switch operation, automatically advances the roll film one step, leaving the apparatus ready for the next exposure.

However, the shadow image upon the fluorescent screen usually persists for a short period, say two or three seconds after the X-ray tube circuit is opened, during which period, while the image is dying away, it still is strong enough to affect the film. Consequently, immediate advance of the film causes fuzziness or a somewhat blurred image, with loss of detail and possible obscurity respecting the particular information sought by the exposure.

The present invention has for its object to provide improved film feeding or advancing means in which, after a starting impulse, actual advance of the film is delayed during a short interval, of the order of, say, two seconds or so, a period long enough to permit the fluorescent image to fade sufficiently to avoid or prevent blurring or fuzziness and insure a sharp, deep negative.

Another object is to provide improved mechanical means for causing time delay in film advance, such means being of relatively simple form, reliable in operation and not likely to get out of order in service.

Still another object is to provide improved mechanism of the character described, including a yieldable pressure plate for holding the film in flat form, together with means for releasing said plate during film advance, but subject to the same time delay as the film advancing means.

A further object is to generally simplify and improve the mechanism in a manner to secure clean, sharp negatives free from fuzziness or blurring and hence of high quality.

Further objects of the invention in part are obvious and in part will appear more in detail hereinafter.

In the drawings, which represent one suitable embodiment of the invention:

Figure 2:
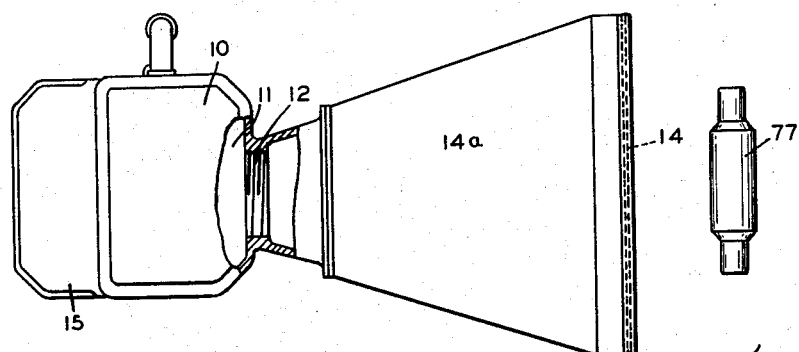
Fig. 2 is a plan view, on a reduced scale.
Figure 3:
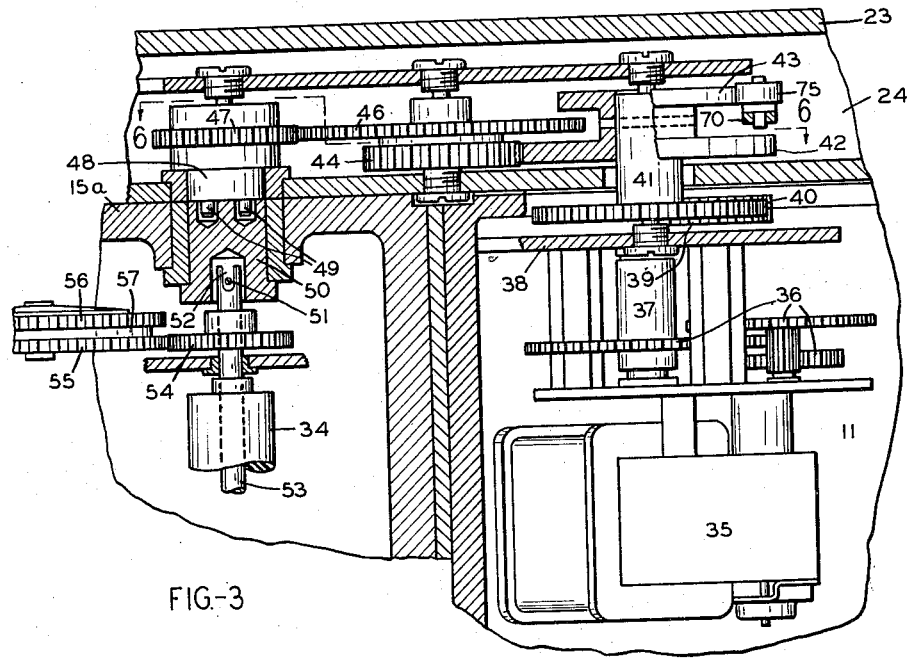
Fig. 3 is a sectional elevation, on the line 3—3, Fig. 1.
Figure 4:
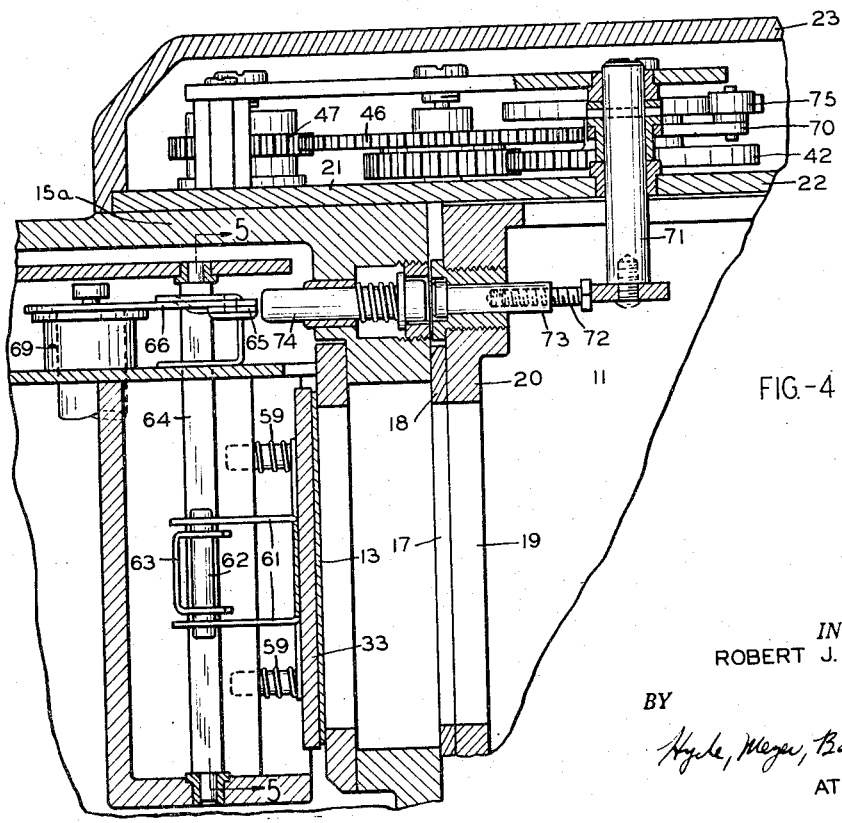
Fig. 4 is a sectional elevation, on the line 4—4, Fig. 1.

Referring first to Fig. 2, the X-ray photographic apparatus here involved comprises a hollow camera body portion or frame 10 enclosing a light tight chamber 11 and in a threaded portion 12 of which is mounted the usual photographic lens (not shown) capable of focusing upon the active portion of the film 13 the negative reproduction of an X-ray shadow image cast upon a transparent fluorescent screen 14 mounted at the outer end of a hood 14a, to which the camera is attached, all in the usual manner. The camera is designed to employ, for example, 70 mm. imperforated X-ray roll film up to one hundred feet long mounted to travel from spool to spool with up to four hundred or so exposures per roll. The film spools, pressure plate and some operating parts therefor are mounted in and carried by a detachable film magazine or unit 15, slidably supported upon guide flanges 16 (Fig. 1) of the camera housing, while the power motor, transmission and actuating mechanism are mounted in and carried by the housing. When the film unit is slid into place, by motion from the bottom toward the top in Figs. 3 and 4, a window opening 17 in the front wall 18 of the film unit registers with a corresponding opening 19 in the rear wall 20 of the housing 10, as shown in Fig. 4, and a portion of top wall 15a of the film unit casing lies beneath the overhanging extended portion 21 of the top plate 22 of the camera housing 10. A removable cover 23 attached to plate 22 provides a supplemental chamber 24 in which certain mechanism is located. Suitable locks or latches (not shown) releasably hold the camera and film casings together in operative relation, as will be readily understood.

Within the chamber of the film unit are rotatably and removably mounted a film supply spool 30 and a film take-up spool 31. The film 13 is led from the supply spool around an idler roller 32, then across the field in flat form in front of a pressure plate 33 to and around a metering roll 34, and then to the take-up spool. Metering roll 34 and take-up spool 31 are both driven by the same mechanism, now to be described.

Within the chamber 11 of the camera housing is mounted an electric motor 35 (Fig. 3) the spindle of which, through speed reducing gearing marked generally 36, drives a shaft 37 extending through a supporting plate 38, beyond which said shaft carries a small pinion 39 meshing with a large gear 40 on a shaft 41. Shaft 41 extends through the top wall 21 of the housing into supplemental chamber 24, where it supports an interrupted gear 42 and a cam 43.

Figure 6:
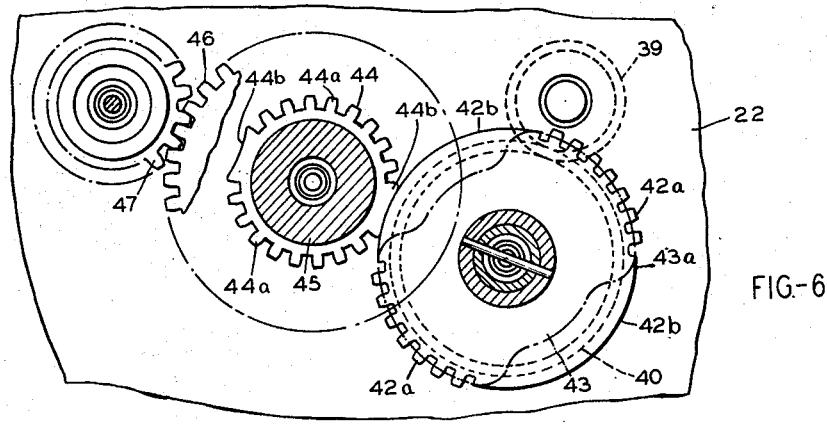
Fig. 6 is a detail sectional view on the line 6—6, Fig. 3.

Interrupted gear 42 has two diametrically opposite sets of teeth 42a, Fig. 6, each set lying opposite or beneath one of the two high lobes 43a of the cam. Between the sets of gear teeth the gear 42 has plain convex circular portions 42b, each lying beneath a low or recessed portion 43b of the cam.

Gear 42 cooperates with and drives a second gear 44 on a stub shaft 45, said gear 44 having two sets of gear teeth 44a between which sets are located stop members 44b, each having a concave curved surface fitting and cooperating with one of the plain surfaces 42b of gear 42. Shaft 45 also supports a large pinion 46 meshing with a smaller pinion 47 on a shaft 48, journalled in the overhanging portion of wall 21, the end of said shaft having clutch pins 49 entering recesses in the end of a coupling member 50 mounted in the upper wall 15a of the film unit. This coupling supports a cross pin 51 adapted to enter a cross slot 52 in the end of the shaft 53 of metering roll 34 for driving the same.

Pins 49 and their cooperating recesses in member 50 form an endwise separable driving connection between that part of the gearing carried by the camera unit and that carried by the film unit, enabling the two to be separated when desired. Pin 51 and its slot enable the film operating mechanism to be removed from the casing of the film magazine.

Shaft 53 is provided with a pinion 54 which meshes with a gear 55 coaxial with a second gear 56 and coupled to it by friction material 57, so that drive from gear 55 to gear 56 is through a yielding friction clutch, enabling gear 56 to slip as spool 31 fills up.

Gear 56 drives a pinion 56a which meshes with gear 58 on the shaft of spool 31. Gears 54 and 58 are of like pitch diameter.

Figure 1:
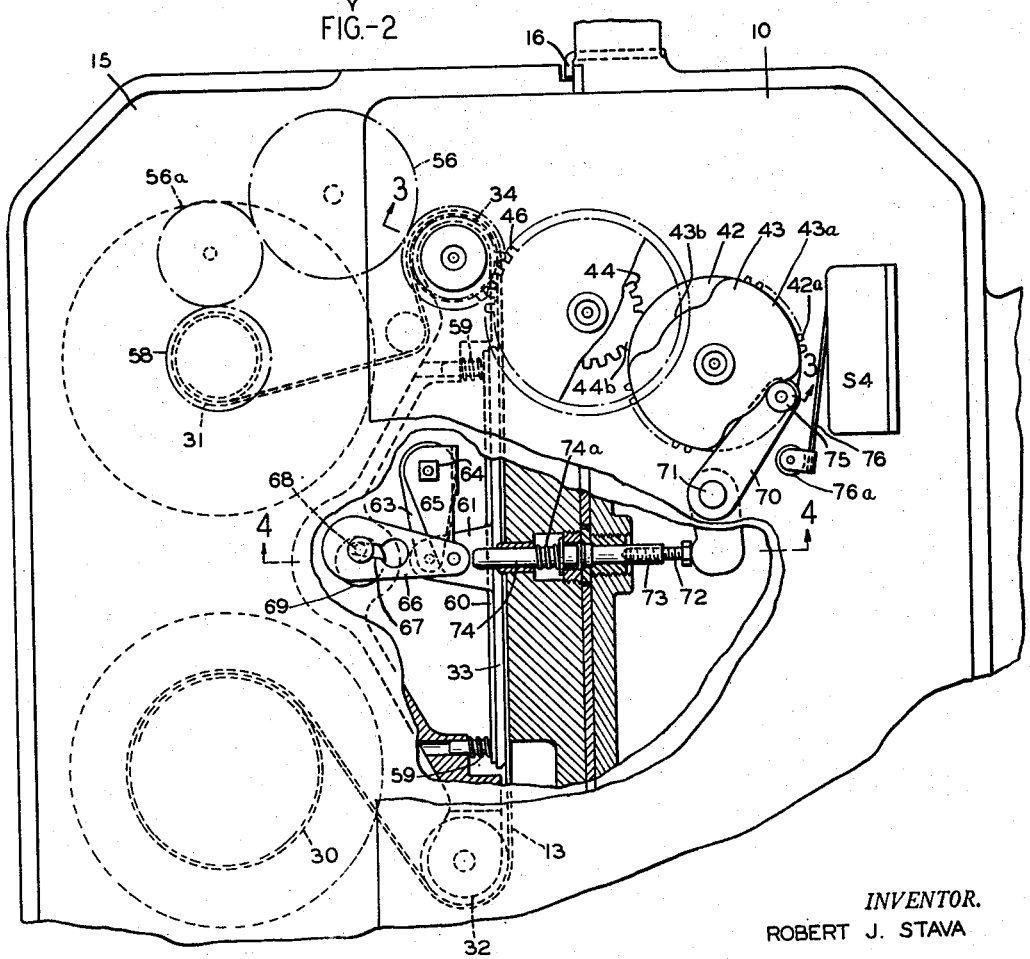
Fig. 1 is a plan view, with the cover removed, parts being broken out and in section.
Figure 5:
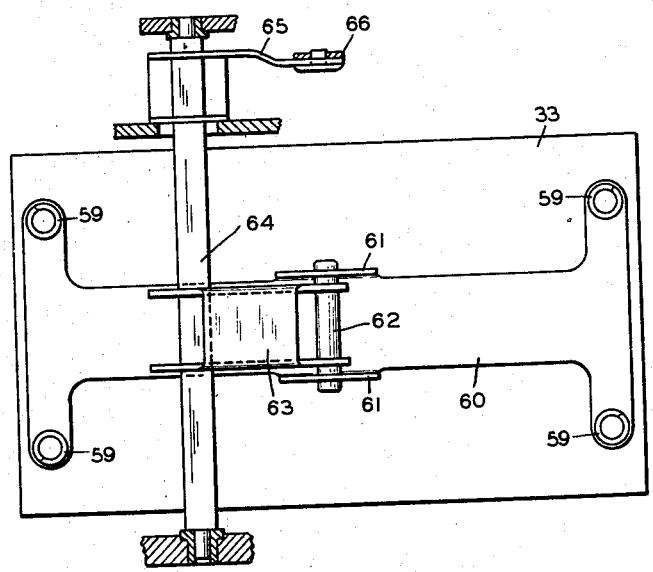
Fig. 5 is a sectional elevation on the line 5—5, Fig. 4.

Referring to Figs. 1 and 5, the pressure plate 33 is yieldingly advanced by springs 59 to press the film against those portions of the wall of the film magazine surrounding the window opening thereof. When the film is fully wound upon the take-up spool this plate serves as a shutter, closing the magazine against light rays. Plate 33 supports a metal backing member 60 having ears 61 supporting a pin 62 to which is connected one end of an arm 63 on a shaft 64 having a second arm 65 pivoted to a link 66 having a slot 67 through which passes a pin 68 eccentrically mounted on the end of a shaft 69. Pin 68 is normally stationary and serves as a guide to cause endwise motion of link 66 when it is operated, as will appear later.

The lobes of cam 43 are effective upon one arm of a two-armed lever 70 pivoted at 71, the second arm abutting the head of an adjustable set screw 72 in a plunger 73 slidably mounted in a bushing in the wall of the camera unit. Said plunger is alined with the end of a push rod 74 mounted in the wall of the film magazine and urged toward plunger 73 by a spring 74a. The opposite end of push rod 74 lies opposite the free end of link 66.

One arm of lever 70 also engages a roller 76a on the end of the operating lever 76 of a normally open switch S4 in the control circuit.

Figure 7:
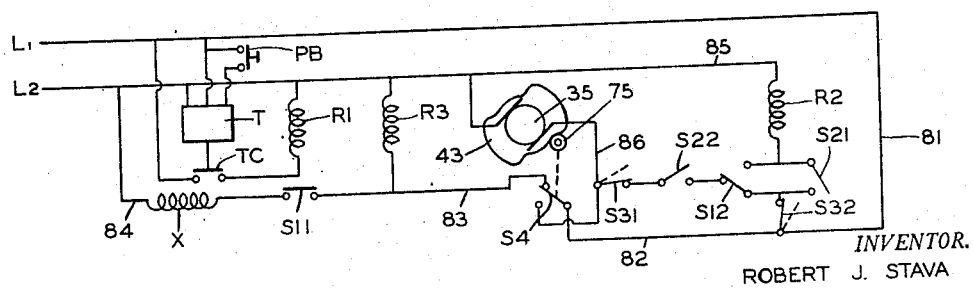
Fig. 7 is a wiring diagram, illustrating somewhat conventionally the control circuits.

Referring to Fig. 7, the control devices shown are as follows:

T represents a suitable timing device controlled by push button PB and capable of adjustment so that when energized it will close contacts TC and hold them closed during any desired exposure period.

X represents a relay which, when energized, causes operation of the X-ray tube conventionally indicated at 77, Fig. 2.

R1 is a relay which, when energized, closes normally open switch S11 and also moves the biased double-throw switch S12 from the position shown to its opposite position.

R2 is a relay which, when energized, closes normally open switches S21, S22.

R3 is a relay which, when energized, closes normally open switches S31, S32.

S4 is a double-throw switch actuated by the cam 43 driven by motor 35.

All parts are shown in the normal positions which they occupy at the beginning of a cycle ready for initiation of an exposure and the production of a negative from the shadow image of a patient located between the X-ray tube 77 and fluorescent screen 14.

The roller 75 on lever 70 has dropped off from the high lobe 43a of cam 43, which rotates counterclockwise in Fig. 1. A smooth tooth-free portion 42b of gear 42 is in engagement with one of the curved stop lugs 44b of the cooperating pinion 44. Thus gear 44 is locked and is nonrotatable, which serves to also lock the metering roll 34 against rotation.

It will be observed that relay R3 is normally energized. In fact this relay is energized all of the time, except during most of the film transport or advance interval. It is energized by current flowing from L1 by way of conductors 81, 82, switch S4 in the position shown, conductor 83 and relay coil R3 to L2. This relay holds switches S31 and S32 closed against their bias to open position.

Cam 43 is in such position that the roller 75 has just dropped off from a high lobe of the cam to a low lobe thereof and switch S4 is in the position shown.

Gears 42, 44 constitute a modified Geneva stop movement, their operation including lost motion, with consequent time delay.

The operation is as follows:

Push button PB is pressed, energizing the timing device T, which closes switch TC, thus energizing relay coil R1. Energization of this coil produces two effects.

First, it closes switch S11, thus energizing relay X and the X-ray tube 77 which it controls, beginning the exposure. Current flow is from L1 by wires 81 and 82, switch S4 in the position shown, conductor 83, switch S11, now closed, relay X and conductor 84 to L2. The exposure continues so long as the relay R1 holds S11 closed which keeps relay X energized.

The second effect is to move switch S12 from the position shown to its second position. This energizes relay R2, by current flowing from L1 by conductor 81, switch S32, now closed, switch S12, and relay R2 to conductor 85, to L2. Closing of relay R2 closes normally open switches S21, S22.

The closing of switch S21 provides a maintaining circuit for relay R2, by flow from conductor 81, through switches S32 and S21 and relay coil R2 to conductor 85 and to L2.

The exposure continues until finally timer T automatically opens the contacts TC, thus deenergizing relay coil R1. This in turn causes opening of switch S11 thus deenergizing relay X and the X-ray tube which it controls. At the same time switch S12, which has been maintaining a circuit to coil R2, returns to its original position, as the result of the deenergization of coil R1. Thereupon, a motor circuit is completed from L1 by conductor 81, switch S32, switch S12, switches S22 and S31, conductor 86, and motor 35 to conductor 85 and to L2.

The mechanism is what is termed a two-cycle mechanism, in the sense that one complete rotation of shaft 41, interrupted gear 42 and the cam 43 produce two complete cycles of advance of the film. When the motor starts, while it rotates shaft 41, that rotation at first is ineffective upon any other parts, because the low lobe of the cam 43 is traveling past the roller 75, without effect upon arm 70, and a smooth or plain portion 42b of gear 42 of the interrupted gear mechanism or Geneva stop movement is traveling, with lost motion, past a stop lug 44b which is therefore held stationary, so that shaft 45 does not turn. Approximately 75° of the total 180° of movement of shaft 41 are devoted to intentional time delay, amounting to a period of the order of one and a half to two or three seconds, for the purpose of enabling the image on the fluorescent screen to fade or die away while the film is held stationary, and thus without liability of blurring or obscuring the negative image being produced on the film.

After approximately 75° of rotation, the next high lobe 43a of the cam becomes effective upon roller 75 and turns lever 70 clockwise in Fig. 1. Lever motion is transmitted through plunger 73 to push rod 74, which in turn communicates the motion to the end of link 66. This link slides to the left in Fig. 1, its motion being guided by the pin 68 and slot 67. Motion of the link is communicated through lever arm 65, shaft 64 and arm 63 to the pressure plate, which is moved bodily to the left in Fig. 1 against the pressure of springs 59, thus relieving the film of pressure, ready for advance.

Simultaneously the smooth portion 42b of the interrupted or Geneva gear 42 passes beyond the stop lug 42b and the teeth 42a engage teeth 44a of pinion 44. This pinion begins to rotate, turns shaft 45 and through gears 46, 47, 54, 55, 56, 57 and 58 drives the take-up spool 31. Shaft 50, carrying the metering roll 34 is also driven. Thus continued operation of the motor, by actuation of the metering roll and take-up spool, advances the film one step.

Contemporaneously with the two operations described, lever 70 moves switch S4 to its second position, thus establishing a maintaining circuit for motor 35, so that when relay coil R2 is deenergized and switch S22 opens, the motor will continue to run. Motor operation continues until the interrupted gear 42 has turned 180°, to a position corresponding to that shown in Figs. 1 and 6, but advanced 180°. The remaining gears turn accordingly. When this new position is reached, the roller 75 drops off from the high lobe of the cam, permits switch S4 to return to its original position and stop the motor, and releases the pressure of plunger 74 on link 66 and permits the pressure plate springs to again become effective upon it. At the same time the second plain portion of the gear 42 enters the curved recess of the next stop lug 44b and locks the driving gearing, thus completing one cycle of film advance operations. All parts are now ready for the next exposure and film advance.

The slip connection between the pinions 55, 56 permits take-up roller 31 to lag behind the metering roller as the film builds up on the take-up spool as will be readily understood.

It should also be noted that the cam lobes on cam 43 and the curved smooth portions of the interrupted gears 42, 44 are so disposed or timed, with relation to each other, in the assembled mechanism that during the cycle of operations the pressure plate backs away from the film before the film begins to advance, and film advance stops before the pressure plate is returned or advances to its holding position, thereby avoiding film abrasion.

The mechanism described is of simple construction, involving but few parts not likely to get out of order and yet insures sufficient delay in actual film advance motion to avoid any possibility of a blurred or obscured negative image. The negatives produced therefore are sharp and clear and capable of easy and correct interpretation.

Other advantages of the invention will be apparent to those skilled in the art.

What I claim is:

1. Film advancing means for an X-ray camera of that type in which X-rays are directed from an X-ray tube through an object upon a fluorescent screen from which the rays are transmitted to an exposed area of a multiple exposure roll film a loop of which is led around a film advancing shaft, comprising an electric motor, timing means for energizing the X-ray tube during a predetermined exposure interval, means controlled by said timing means for energizing said motor at the conclusion of the exposure interval, and operating mechanism connecting said motor and shaft, said operating mechanism including an interrupted gear movement so arranged that, upon energization of said motor, initiation of rotation of the driven side of said gear movement and of said shaft is delayed pending the lapse of a time interval and consequent material fading of the fluorescent image.

2. Film advancing means for an X-ray camera of that type in which X-rays are directed from an X-ray tube through an object upon a fluorescent screen from which the rays are transmitted to an exposed area of a multiple exposure roll film a loop of which is led around a film advancing shaft, comprising an electric motor, timing means for energizing the X-ray tube during a predetermined exposure interval, means controlled by said timing means for energizing said motor at the conclusion of the exposure interval, operating mechanism connecting said motor and shaft, said operating mechanism including an interrupted gear movement so arranged that upon energization of said motor initiation of rotation of the driven side of said gear movement and of said shaft is delayed pending the lapse of a time interval and consequent material fading of the fluorescent image, and means operated by said motor when rotation of the driven side of the gear movement has concluded for deenergizing its own energizing means to stop film advance beyond a definite amount.

3. Film advancing means for an X-ray camera of that type in which X-rays are directed from an X-ray tube through an object upon a fluorescent screen from which the rays are transmitted to an exposed area of a multiple exposure roll film a loop of which is led around a film advancing shaft, comprising an electric motor, timing means for energizing the X-ray tube during a predetermined exposure interval including exposure producing and exposure ending operations, means controlled by said timing means for energizing said motor at the conclusion of the exposure interval, operating mechanism connecting said motor and shaft including a pinion having teeth interrupted by a stop member having a concave arcuate exterior face, said pinion operatively connected with said shaft, said mechanism including a gear having teeth adapted to mesh with said pinion teeth and interrupted by a convex arcuate face adapted to nest with said arcuate face of said pinion, said gear operatively connected with said motor, means stopping said motor approximately when said arcuate faces begin to register, and means for energizing said motor concurrently with the termination of an X-ray exposure, whereby said film is not advanced by rotation of said shaft until said arcuate face of said gear completely passes said stop member thereby preventing blurring of the image on said film due to persistence of the fluorescent image on said screen after exposure termination.

4. The combination of claim 3 including a cam having a high zone coaxial with said gear teeth and having a low zone coaxial with said gear arcuate face, first and second electrical energizing circuits for said motor including switch means having first and second positions for causing closing of said first and second circuits respectively, follower means between said cam and said switch means for moving the latter to first and second circuit closing positions respectively as said follower engages said low and high cam zones, means for disabling said first motor energizing circuit responsive to said timing means exposure producing operation, means for enabling said first motor energizing circuit responsive to timing means exposure ending operation and means for disabling said first motor energizing circuit responsive to movement of switch means to second circuit closing position, whereby said second circuit operates said motor until said cam means causes movement of said switch means out of second circuit closing position back to first circuit closing position.

ROBERT J. STAVA.

REFERENCES CITED

The following references are of record in the file of this patent:

UNITED STATES PATENTS

| Number | Name | Date |
|---|---|---|
| 2,166,440 | Jones | July 18, 1939 |
| 2,331,225 | Powers | Oct. 5, 1943 |
| 2,433,129 | Land | Dec. 23, 1947 |

FOREIGN PATENTS

| Number | Country | Date |
|---|---|---|
| 554,699 | Great Britain | July 15, 1943 |
| 555,885 | Great Britain | Sept. 10, 1943 |
| 557,050 | Great Britain | Nov. 2, 1943 |